(12) United States Patent
Rossi

(10) Patent No.: US 8,001,365 B2
(45) Date of Patent: Aug. 16, 2011

(54) EXCHANGE OF PROCESSING METRIC INFORMATION BETWEEN NODES

(75) Inventor: Frederic Rossi, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 508 days.

(21) Appl. No.: 11/955,933

(22) Filed: Dec. 13, 2007

(65) Prior Publication Data
US 2009/0154366 A1    Jun. 18, 2009

(51) Int. Cl.
  G06F 15/173    (2006.01)
  G06F 7/38    (2006.01)
  H04L 12/28    (2006.01)

(52) U.S. Cl. ......... 712/245; 712/225; 709/226; 370/351

(58) Field of Classification Search .................. 709/225, 709/226, 229; 370/395.1, 216, 218, 230, 370/232, 241, 252, 253, 254, 346, 450, 449, 370/229; 713/300, 320, 324, 322, 323; 712/225, 712/245

See application file for complete search history.

(56) References Cited

U.S. PATENT DOCUMENTS

| | | | |
|---|---|---|---|
| 6,304,546 B1 | 10/2001 | Natarajan et al. | |
| 6,606,658 B1 * | 8/2003 | Uematsu | 709/225 |
| 7,146,174 B2 * | 12/2006 | Gardner et al. | 455/453 |
| 7,366,104 B1 * | 4/2008 | Choudhury et al. | 370/252 |
| 7,536,567 B2 * | 5/2009 | Bonola et al. | 713/300 |
| 7,561,593 B1 * | 7/2009 | Wilkie | 370/450 |
| 7,693,995 B2 * | 4/2010 | Kudo et al. | 709/226 |
| 2003/0145081 A1 * | 7/2003 | Lau et al. | 709/224 |
| 2004/0059963 A1 | 3/2004 | Simonnet et al. | |
| 2004/0120252 A1 * | 6/2004 | Bowen et al. | 370/229 |
| 2005/0018611 A1 * | 1/2005 | Chan et al. | 370/241 |
| 2007/0053331 A1 * | 3/2007 | Kolding et al. | 370/338 |
| 2007/0058651 A1 * | 3/2007 | Bowen et al. | 370/412 |
| 2007/0112954 A1 | 5/2007 | Ramani et al. | |

OTHER PUBLICATIONS

International Search Report from corresponding application PCT/IB2008/054587.
Richard Draves et al., Comparison of Routing Metrics for Static Multi-Hop Wireless Networks, Proceedings of the 2004 Conference on Applications, Technologies, Architectures, and Protocols for Computer Communications, Portland OR, Aug.-Sep. 2004.
Douglas S.J. De Couto et al., A High-Throughput Path Metric for Multi-Hop Wireless Routing, International Conference on Mobile Computing and Networking, San Diego, CA, Sep. 2003.
Guohong Cao et al., Purposeful Mobility in Tactical Sensor Networks, published in Sensor Network Operations by IEEE Press in 2005.

* cited by examiner

*Primary Examiner* — Hanh Nguyen
(74) *Attorney, Agent, or Firm* — Alex Nicolaescu; Ericsson Canada Inc.

(57) ABSTRACT

Method and nodes are provided for propagating between the nodes information about processing capacity of peer nodes. Two types of signals are sent from propagating nodes towards their peer nodes. A propagating node sends first signal type at a constant rate and a second signal type at a variable rate. A ratio of the rates calculated at a peer node represents the processing capacity available a propagating node. Sequence numbers may be added to signals of the first and second type in order to assist peer nodes in detecting capacity issues.

21 Claims, 6 Drawing Sheets

| PEER IDENTITY | 1ST SIGNAL TIME | 1ST SIGNAL RATE | 2ND SIGNAL TIME | 2ND SIGNAL RATE | RATIO | COST IN ROUTING TABLE | E-SQN |
|---|---|---|---|---|---|---|---|
| $P_1$ | $T1_1$ | $R1_1$ | $T2_1$ | $R2_1$ | 10 | LOW | $E_1$ |
| $P_2$ | $T1_2$ | $R1_2$ | — | 0 | 0 | HIGH | $E_2$ |
| $P_3$ | — | 0 | $T2_3$ | $R2_3$ | $\infty$ | HIGH | $E_3$ |
| $P_4$ | $T1_4$ | $R1_4$ | $T2_4$ | $R2_4$ | 7 | MEDIUM | $E_4$ |
| ... | ... | ... | ... | ... | ... | ... | ... |

Fig-6

EXCHANGE OF PROCESSING METRIC INFORMATION BETWEEN NODES

TECHNICAL FIELD

The present invention relates to methods and nodes for exchanging metric information between nodes about computing capacity.

BACKGROUND

In a network of computing nodes, communication between the nodes may occur according to predefined rules, or may take place according to metrics based on current conditions of the network. Node coordination in networks, especially in ad-hoc networks, can be problematic. For example, when several nodes do not all have the same processing power, routing solely according to known or expected capacities of links between the nodes may not be efficient. Some networks are designed with variable levels of flexibility allowing some of their nodes to select a destination between peer nodes upon sending of messages or requests. In order to allow those networks to operate in an efficient manner, it becomes necessary to provide improved metrics enabling the nodes to make such selections.

A simple manner of balancing load on two co-processors is simply to allocate certain tasks on one processor and other tasks on the other processor. For example one central processing unit (CPU) on a personal computer might handle graphic display while the other CPU handles computation of input data. This sort of pre-arranged configuration is quite inefficient when, for example, a large amount of input data needs to be processed before any output can be graphically displayed.

Other processing load balancing methods rely on scanning of various processors to obtain a length of task queues waiting for treatment at each processor. This method may only be effective when the various processors are co-located, in the case of co-processors for example, and rely on one separate processor dedicated at least in part to running the scanning process.

Parallel scheduling is another approach for load balancing. In parallel scheduling methods, all processors cooperate to schedule work. Parallel scheduling balances load by using global load information at compile-time or runtime. These methods generally rely on a predetermined allocation of tasks to various processors, taking into account their relative processing capabilities. Parallel scheduling methods are hardly adaptable to changing conditions such as time varying requirements in terms of load imposed on the nodes.

A metric that is commonly used along with routing protocols to find an optimal computing path between two nodes is called minimum hop-count. Various paths between two nodes are compared and a number of discrete links, repeaters, routers and/or gateways are counted, yielding a number of hops per path. A given path on which the number of hops is smallest is selected as the optimal path for connecting the two nodes. When a first node has a choice of communicating with two or more peer nodes, the one of the peer nodes that may be reached using a minimum number of hops may be selected. Hence, minimum hop-count may be used to select one of a plurality of paths between two nodes, or may be used to select one of a plurality of peer nodes.

It has been shown that hop-count routing is not appropriate in an environment where nodes have different capabilities. For example, in "A High-Throughput Path Metric for Multi-Hop Wireless Routing", D. S. J. De Couto et al., M.I.T. Computer Science and Artificial Intelligence Laboratory, International Conference on Mobile Computing and Networking, San Diego Calif., September 2003, authors demonstrate that minimum hop-count routing techniques have poor performance in some environments. They propose another metric, based on an expected transmission count, which is calculated using forward and reverse delivery ratios of links placed between two nodes. In contrast, other authors of "Comparison of Routing Metrics for Static Multi-Hop Wireless Networks", R. Draves et al., Microsoft Research, Proceedings of the 2004 conference on Applications, technologies, architectures, and protocols for computer communications, Portland Oreg., August-September 2004, claim that hop-count metrics outperform other link-quality metrics when a sender of messages is mobile.

Nevertheless, prior art methods that rely on hop-count or on more advanced metrics to determine the best routing paths do not account for the fact that some nodes may have very high, or very low, traffic handling capabilities. Node coordination based solely on communication means between the nodes, not accounting for the capacity limits or current load of the nodes themselves, do not solve problems related to the exchange of metric information between nodes about their respective processing capacity, so that nodes can optimally use the capacity of a network.

SUMMARY

There would be clear advantages of having a means for ensuring that communicating nodes obtain accurate and up-to-date information about current processing capabilities of their peer nodes. It is therefore a broad object of this invention to provide methods and nodes for exchanging metric information between nodes about the processing capacity of one of the nodes.

A first aspect of the present invention is directed a method of obtaining information about a processing capacity of a node. The method comprises a first signal received at a first rate from the node. A second signal is also received, at a second rate, from the node. A ratio between the second rate and the first rate is calculated. The processing capacity of the node is determined based on a comparison of the ratio with a preset value.

A second aspect of the present invention is directed to a variant of the method of obtaining information about a processing capacity of a node. Each successive first signal comprises a sequence number calculated based on a sequence number of a previous first signal. When a second signal is received immediately after a latest first signal, it comprises a sequence number based on a sequence number of the latest first signal. Thereafter, each successive second signal received before a next first signal comprises a sequence number based on a sequence number of a previous second signal. An expected sequence number of a next second signal is calculated based on the sequence number of the latest first signal or of the previous second signal. An eventual capacity problem is detected by receiving the next second signal comprising a sequence number that is not equal to the expected sequence number.

A third aspect of the present invention is directed to a method of propagating information about a processing capacity of a node. The method is initiated with a step of determining an offered capacity value. The offered capacity value is equal to or less than a preset value indicative of a normal processing capacity of the node. The node sends a first signal periodically at a base rate. The node also sends a second signal periodically at a second rate indicative of the offered capacity value.

A fourth aspect of the present invention is directed to a node for propagating information about its processing capacity. The node comprises a processor and a load indicator that indicates a load level of the processor. One or more interfaces are adapted to send signals towards peer nodes. A control logic requests the one or more interfaces to send a first signal at a first rate. The control logic reads the load level of the processor and calculates a second rate based on a comparison of the load level with a maximum amount of processing capacity of the node. The control logic requests the one or more interfaces to send a second signal at the second rate.

A fifth aspect of the present invention is directed to a node for obtaining information about a processing capacity of a peer node. The node comprises one or more interfaces that receive signals from the peer node. The node also comprises a control logic. The control logic receives from the one or more interfaces a first signal multiple times. It determines a first rate of the first signal. The control logic also receives from the one or more interfaces a second signal multiple times and determines a second rate of the second signal. The control logic then calculates a ratio between the second and first rates and stores in a peer table a processing capacity of the peer node based on the ratio.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 6 shows an exemplary peer table according to some aspects of the present invention.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and a node for exchanging metric information between nodes about the processing capacity of one of the nodes. Peers of the node can use this metric information for example to adjust their routing tables to better use an overall capacity of a network. A processing node of interest broadcasts a HELLO message at regular intervals, for example every 10 seconds. The processing node then broadcasts ALIVE messages at a higher rate, for example once per second. Peer nodes compute a ratio between the ALIVE and HELLO messages, which would be 10:1 in the present example. HELLO messages are sent at a constant rate. ALIVE messages may be delayed somewhat by the processing node if the processing node is experiencing high load or congestion, or if for any reason, it is desired to reduce traffic load imposed on the node. In the case where the processing node is down or where a path between the interface of the processing node and the peer node is down, the ratio approaches infinity.

A peer node may use the ratio to adjust its routing table, for example by reducing or avoiding sending traffic towards a processing node showing a ratio above 1. Between any number of peer nodes, some or all of the nodes may be considered as nodes of interest in the context of the present invention, and any peer may need to receive information about the processing capacity of any other peer. As such, while a first node receives periodic HELLO and ALIVE messages from a second node, it may also concurrently send its own periodic HELLO and ALIVE messages towards that second node.

In the context of the present invention, a node may comprise any computing element comprising a processor and having means to communicate with a peer element. Examples of nodes that may implement the present invention comprise co-processors within a computer, routers, servers, switches and the like. Peer elements may be similar, for example two co-processors on a same computer, or dissimilar, comprising for example a server having a router as a peer, or a cellular mobile switching center having a radio base station as a peer.

Figure 1:
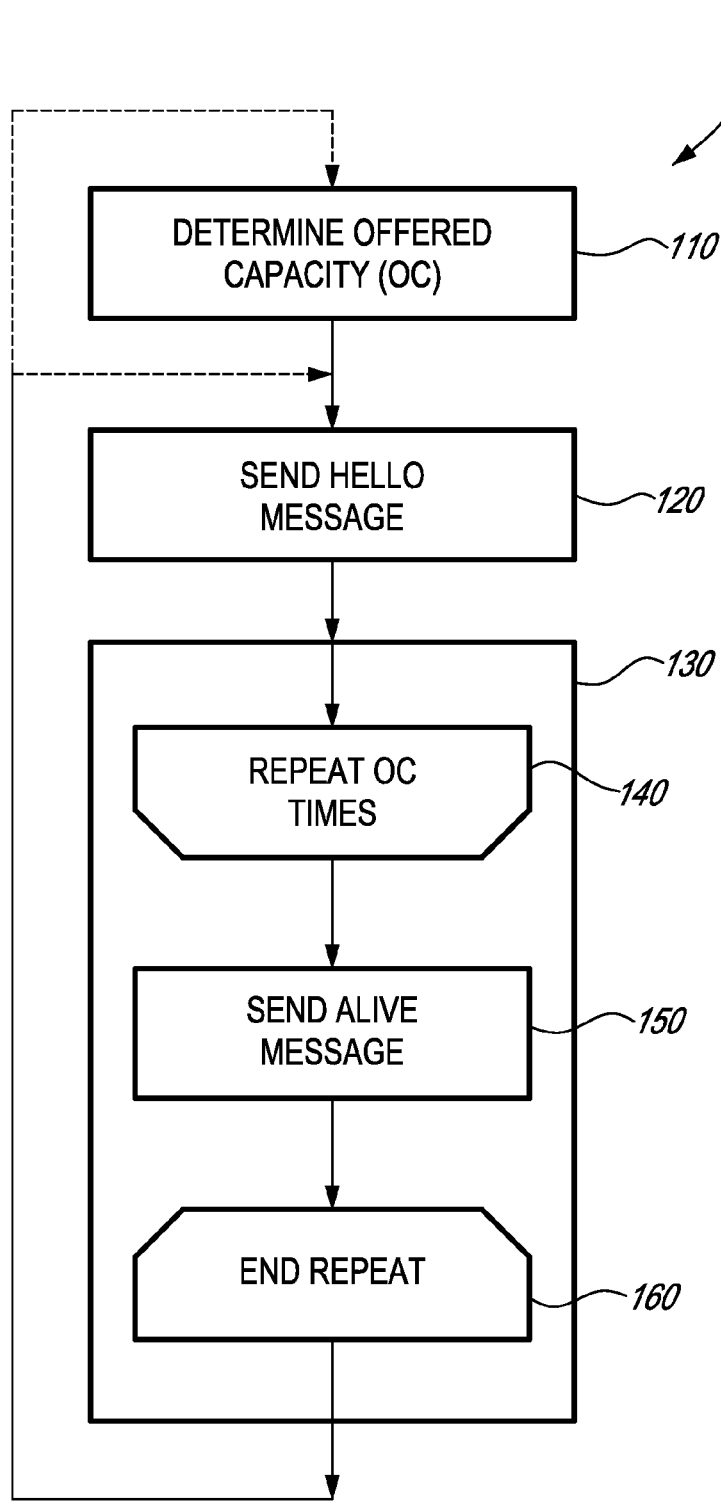
FIG. 1 shows an exemplary method of propagating information about a processing capacity of a node.

Reference is now made to the Drawings, in which FIG. 1 shows an exemplary method of propagating information about a processing capacity of a node, according to some aspects of the present invention. The steps of a sequence 100 may for example be implemented in a node of interest that has a normal or nominal processing capacity, that may handle requests from peer nodes to execute some function processing on their behalf, and that may from time to time detect that its processing load is reaching some predetermined limit. At step 110, the node of interest determines an offered capacity value (OC). The offered capacity value may not exceed a preset value, representative of a maximum amount of processing that the node of interest may provide to peer nodes. The node of interest may determine the offered capacity in various ways. In some embodiments, the offered capacity may be deemed nominal as long as processor load remains within a preset limit, for example the processor load at less than 70 percent may yield a nominal offered capacity. In other embodiments, the offered capacity may be a linear representation of the processor load, wherein for example the offered capacity is 90 percent when the processor load is at 10 percent, or the offered capacity is 40 percent when the processor load is at 60 percent. The offered capacity may represent a lower value than an actual processing capacity of the node of interest in order to protect that node from possible surges in requests for processing. Other variations, including non-linear relations between the actual processing capacity and the offered capacity, may also be used without departing from the invention.

At step 120, the node of interest sends a first signal, for example a HELLO message, on one or more of the interfaces of the node. The HELLO message preferably comprises an identity of the node of interest, but that identity may be omitted in cases where only one node of interest propagates information about its processing capacity. The HELLO message is sent towards any number of peer nodes of the node of interest and is used as a heartbeat of the node of interest. As is detailed below, the sequence 100 is repeated continuously in a manner to ensure that the HELLO message is sent at a first rate, or base rate, which is preferably a constant rate. The node of interest then sends a plurality of a second signal, for example an ALIVE message, in a loop 130 comprising steps 140, 150 and 160. The ALIVE message also preferably comprises the identity of the node of interest. The ALIVE message is sent at step 150, and is also sent towards all the peer nodes, on the same interfaces of the node of interest. Of course, if there is no offered capacity (OC is equal to 0), the ALIVE signal is not sent at step 150. Repetition in the loop 130, as controlled by steps 140 and 160, ensures that the ALIVE message is sent OC times following each HELLO message. As a result, the ALIVE message is sent at a second rate that is a function of the offered capacity value. For example, the rate of the ALIVE message may be equal to the base rate multiplied by the offered capacity value. When the loop 130 is completed, the sequence 100 may alternatively continue at steps 110 or 120. In some embodiments, the offered capacity value may be determined at step 110 once before sending every HELLO message. In other embodiments, depending on applications of the node of interest or of the peer node, the offered capacity value may be determined at step 110 less frequently. Other sequences equivalent to the sequence 100 may be used to send the HELLO and ALIVE messages at first and second rates, wherein the second rate is related to the offered capacity. For example, the offered capacity may be calculated after sending of the HELLO message, before a first instance of the ALIVE message.

The sequence 100 is preferably executed at a constant rate so that the base rate of sending the HELLO message is constant. The rate of the ALIVE message is variable, as a means to enable the peer nodes to estimate the processing capacity of the node of interest by comparing the rates of the HELLO and ALIVE messages. In embodiments where the base rate varies somewhat, the peer nodes may still estimate the processing capacity of the node of interest by comparing a number of received ALIVE messages following every HELLO message. However when the base rate is substantially constant, the peer nodes may advantageously average calculations of the processing capacity of the node of interest by comparing the rate of the ALIVE message over a long period with a fixed base rate of the HELLO message.

The periodicities of the HELLO and ALIVE messages can be determined according to the applications served by the various nodes sending and receiving those messages, according to the nature of the nodes, or according to the manner in which the nodes are connected. For example, if the node of interest and its peer nodes are linked at an ISO layer 2 level, for example by being connected to a same Ethernet link or on a same backplane within a processing rack, the HELLO message may exemplary be sent at a rate of once per second and the ALIVE message may be sent at a rate of up to several times per second when the processing capacity is nominal. If the nodes are connected at an ISO layer 3 level and if the HELLO the ALIVE message need to be transmitted as IP packets or as ATM frames, the rate of the HELLO message might be once per every several seconds while the rate of the ALIVE message might be on the order of once per second when the processing capacity is nominal. Two or more co-processors of a same personal computer, having processing clock speeds on the order of 1 GHz, may send the HELLO and ALIVE messages on the order of every millisecond or so. In some applications, the rates at which messages are sent may be much higher or lower.

Figure 2:
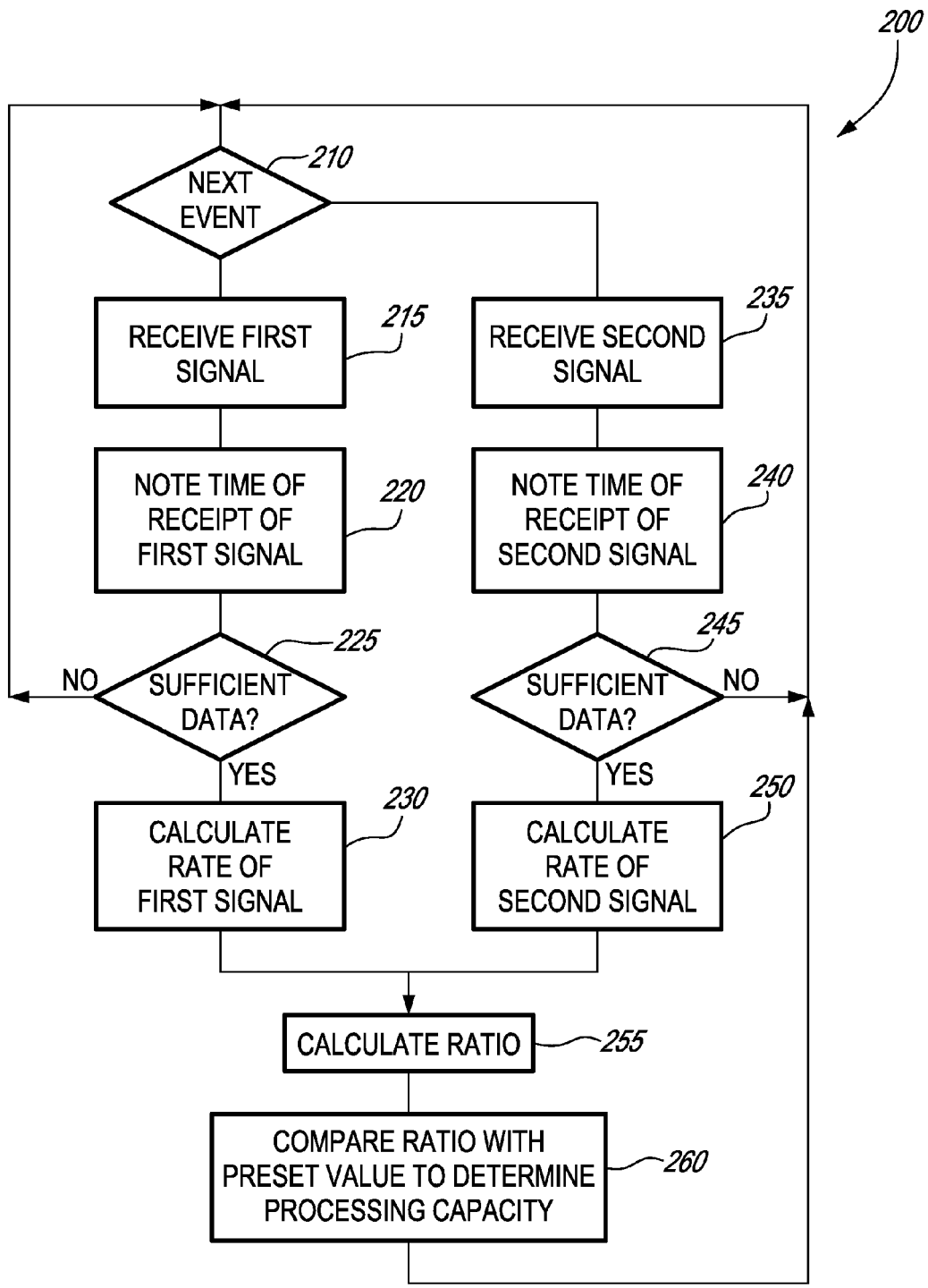
FIG. 2 shows an exemplary method of obtaining information, at a peer node, about a processing capacity of a node of interest, according to other aspects of the present invention.

While FIG. 1 shows an exemplary method of propagating information about the processing capacity of a node of interest, FIG. 2 shows an exemplary method of obtaining information, at a peer node, about a processing capacity of the node of interest, according to other aspects of the present invention. The steps of a sequence 200 may for example be implemented in a peer node of the node of interest. Those steps are preferably performed in a continuous manner in the peer node, but they may also be executed at irregular intervals, for example at times when the peer node needs to assess the processing capacity of the node of interest. The method starts at step 210 when the peer node waits for a next event to occur. The next event may be a receipt of a signal of a first type at step 215, the first signal being for example a HELLO message sent by the node of interest. The peer node notes the time of receipt of the first signal at step 220. At step 225, the peer node determines whether sufficient data to proceed further has been received. If the first signal has been received only once, or if it has been received only once since a restart of the sequence 200, data is deemed insufficient and the process returns to step 210 where a next event is expected. Otherwise, if the first signal has already been received at least twice at step 215, data is deemed sufficient at step 225 to proceed at a next step 230 where a rate of arrival of the first signal is calculated. If the first signal has already been received in several instances, the peer node may optionally average the first rate of arrival over a period of time covering all those instances, or it may simply consider the rate of arrival based on the last two instances of the first signal. The first rate of arrival is in principle constant and rarely varies because it is to be used as a basis for evaluating the processing capacity of the node of interest. The first rate of arrival may however vary when the node of interest or a connection link between the node of interest and the peer node are down, restarting or otherwise incapable of assuming their normal functions. The sequence continues at step 255, which is described below.

Another next event that occurs when the peer node waits at step 210 may be the receipt of a signal of a second type at step 235, the second signal being for example an ALIVE message sent by the node of interest. The peer node notes the time of receipt of the second signal at step 240. At step 245, the peer node determines whether sufficient data to proceed further has been received. If the second signal has been received only once, if it has been received only once since a restart of the sequence 200, or if it has been received in a number of instances that is less than a configurable value, data is deemed insufficient and the process returns to step 210 where a next event is expected. Otherwise, if the second signal has already been received at least twice at step 235, and preferably if the second signal has been received a number times that is at least equal to the configurable value, data is deemed sufficient at step 245 to proceed at a next step 250 where a rate of arrival of the second signal is calculated. The peer node may preferably average the second rate of arrival over a period of time covering a number of such signals. In a preferred embodiment, the rate of arrival of the second signal is calculated over a period since the last first signal has been received. The second rate of arrival may vary because it is to be used as an indicator of a current processing capacity of the node of interest. Following the calculation at step 250, the sequence continues at step 255.

At step 255, which may either follow step 230 or step 250, a ratio of the rates of arrival of the first and second signals is calculated. The second signal is expected to normally have a higher rate of arrival compared to the first signal, so a preferred embodiment divides the second rate of arrival by the first rate of arrival to obtain a ratio that is greater than one in a normal case. Those skilled in the art will readily observe that another embodiment wherein a ratio of the first rate would be divided by the second rate would produce equivalent results. Of course, if at step 255 only one of the first and second rates of arrival has been calculated at steps 230 and 250, the resulting ratio may be zero, or infinity. Such results are not illogical in the context of sequence 200 and may actually be used in obtaining information about the processing capacity of the node of interest. At step 260, the ratio obtained at step 255 is compared with a preset value. The preset value has previously been configured in the peer node, and is equal to an expected ratio of the rates of arrival of the first and second signals when the node of interest is at a normal processing capacity level. The processing capacity of the node of interest is determined from the comparison. For example, if the expected rate of the first signal is once every 10 seconds and if the expected rate of the second signal is once per second, the preset value is equal to 10, where the ratio is obtained by dividing the second rate of arrival by the first rate of arrival (the preset value would be equal to one-tenth (0.1) in embodiments where the ratio is obtained by dividing the first rate of arrival by the second rate of arrival). If the ratio is less than the preset value of 10, this is an indication that the node of interest is slowing down the sending of the second signal in order to indicate a low processing capacity. If the ratio is zero, the node of interest is deemed as not having any usable processing capacity.

When the sequence 200 has very recently been initialized, special cases may occur. A ratio of zero may be obtained at step 255 when the first rate of arrival has been calculated at step 230 while a lack of sufficient data at step 245 prevented calculating the second rate of arrival. The peer node may in this case preferably deem the node of interest as not having any usable processing capacity. An infinite ratio obtained at step 255 may in contrast indicate that the first rate of arrival has not yet been calculated. In other variants, the first and second rates of arrival could be calculated at steps 230 and 250, respectively, without testing for sufficient data at steps 225 and 245. If a signal of a given type has been received only once, then the rate of arrival for this signal type will be deemed extremely slow, also yielding an extreme value of the ratio at step 255. In any of those cases, continuous execution of the sequence 200 will soon ensure that sufficient data is available at steps 225 and 245 to make a proper determination of the processing capacity of the node of interest at step 260.

In other cases, sufficient data may not be obtained at steps 225 or 245 or both because of a communication problem with the node of interest. Whether this leads the ratio to be equal to zero or to infinity, this is indicative that processing capacity of the node of interest is not available to the peer node.

Figure 3:
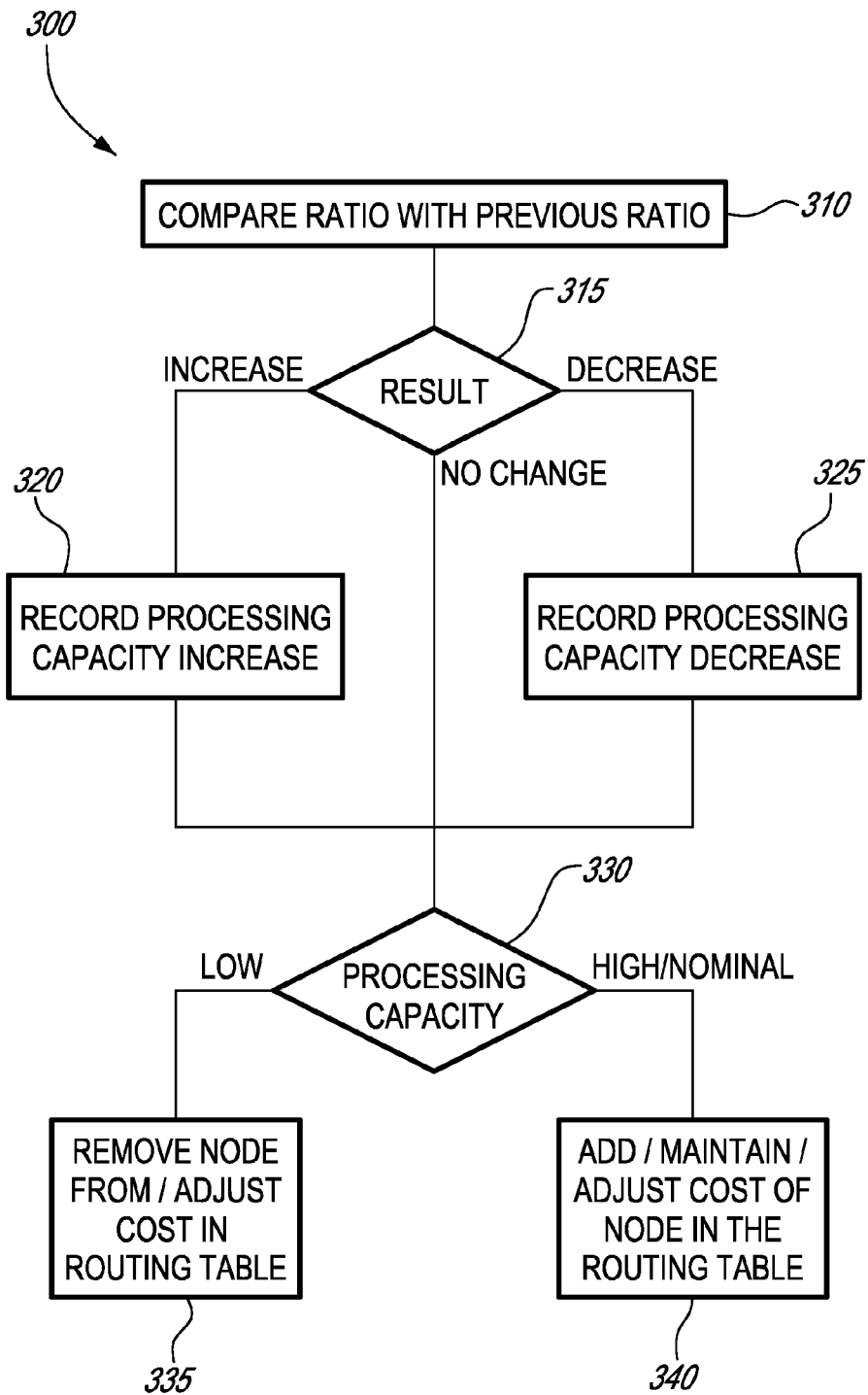
FIG. 3 shows steps of additional aspects of the method of the present invention.

FIG. 3 shows steps of additional aspects of the method of the present invention. Sequence 300 may be executed in parallel with the sequence 200 of FIG. 2. Specifically, sequence 300 may start following the step 260 of FIG. 2 and may be executed whenever the processing capacity of the node of interest is re-evaluated in the continuing process of the sequence 200. Alternatively, the sequence 300 may be executed at irregular intervals, periodically at a lower rate than the rate of the first and second signals, or on an as-needed basis based on the specific needs of the peer node.

After the processing capacity of the node of interest has been determined at step 260, the peer node may take some further actions. Some of these actions may be complementary and the peer node may take some of these actions independently from other actions. The peer node may monitor changes in the processing capacity of the node of interest by monitoring changes in the ratio. At step 310, the ratio obtained at step 255 is compared with a previously stored value of the ratio. At step 315, a result of this comparison may have three distinct values. If the result at step 315 indicates an increase of the ratio, the peer node at step 320 records or otherwise takes note in a memory that the processing capacity of the node of interest has increased. If the result at step 315 indicates a decrease of the ratio, the peer node records at step 325 that the processing capacity of the peer node has decreased. If the result at step 315 indicates that the ratio has not changed, no specific action is taken.

Whether or not steps 310-325 are executed, the sequence may continue at step 330 where the processing capacity of the node of interest, which has been determined at step 260, is evaluated against a predetermined threshold. If the processing capacity is lower than the threshold, the peer node may remove the node of interest from its routing table at step 335. As a result, the peer node will refrain from sending signals, messages or requests towards the node of interest. Of course, removal of the node of interest from the routing table may in some cases be applicable solely to exchange of traffic and payloads, and not apply to maintenance signaling. For example, the peer node may continue sending its own periodic HELLO and ALIVE signals towards the node of interest. Alternatively, the peer node may adjust a cost given to the node of interest in its routing table, a higher cost ensuring that a lesser number of signals, messages or requests will be sent towards the node of interest. At step 330, the processing capacity of the node of interest may be deemed high, or at a nominal level. For example, a processing capacity level above the threshold may be deemed high. Alternatively, capacity may be deemed nominal only when the ratio calculated at step 255 is found equal to the preset value. No matter the precise criteria used to determine that the processing capacity is deemed high or nominal, the node of interest is either added or maintained in the routing table of the peer node at step 340. If the processing capacity of the node of interest has just recently returned to a high or nominal level, the node is added to the routing table. Alternatively, the cost given to the node of interest in the routing table may be adjusted when the processing capacity is deemed high or nominal. If the processing capacity has been continuously nominal for some time, the node was already in the routing table and is maintained therein, and the cost given to the node is maintained at a low value.

The method as illustrated in the sequence 200 of FIG. 2 may comprise additional aspects for adding precision in the process of determining the processing capacity of the node of interest. The first and second signals may, in all of their instances, be sent carrying sequence numbers. When the first signal is sent in a first instance, it comprises a base sequence number. The actual value of the base sequence number sent in the first instance is not relevant in most embodiments. The next instance of the first signal then carries a sequence number according to equation (1):

$$SQN_{firstsignal}=F_1(SQN_{previousfirstsignal}) \quad (1)$$

Where $F_1$ is a relation between sequence numbers of a first signal and of a previous first signal.

The first instance of the second signal sent immediately after a latest first signal carries a sequence number according to equation (2):

$$SQN_{secondsignal}=F_2(SQN_{latestfirstsignal}) \quad (2)$$

Where $F_2$ is a relation between sequence numbers of a second signal and of a latest first signal.

Other instances of the second signal sent thereafter, but before the next first signal each carry a sequence number according to equation (3):

$$SQN_{secondsignal}=F_3(SQN_{previoussecondsignal}) \quad (3)$$

Where $F_3$ is a relation between sequence numbers of a second signal and of a previous second signal.

Various sets of functions $F_1$, $F_2$ and $F_3$ may be used to compute the sequence numbers carried by the first and second signals, as long as those functions enable computation of unambiguous sequences, and as long as the node of interest and the peer node use the same functions.

In a simple example of a use of functions $F_1$, $F_2$ and $F_3$, the base sequence number carried in the first instance of the first signal is equal to zero. Function $F_1$ adds to the sequence number of the previous first signal a number equal to the preset value where, for example, the preset value is equal to 10. Function $F_2$ adds one to the sequence number of the latest first signal. Function $F_3$ adds one to the sequence number of the previous second signal. In this example, the first signal is sent in the first instance with the base sequence number equal to 0. A series of the second signal is then sent with sequence numbers equal to 1, calculated using $F_2$, and then 2, 3, . . . 10, calculated using $F_3$. Then the next instance of the first signal is sent carrying a sequence number equal to 10, calculated using $F_1$.

In other embodiments, more complex functions may be used. As an example, $F_2$ and $F_3$ may comprise a one-way hashing procedure operating on the sequence number while $F_1$ may operate the same one-way hashing, a number of times equal to the preset value, on the sequence number.

Figure 4:
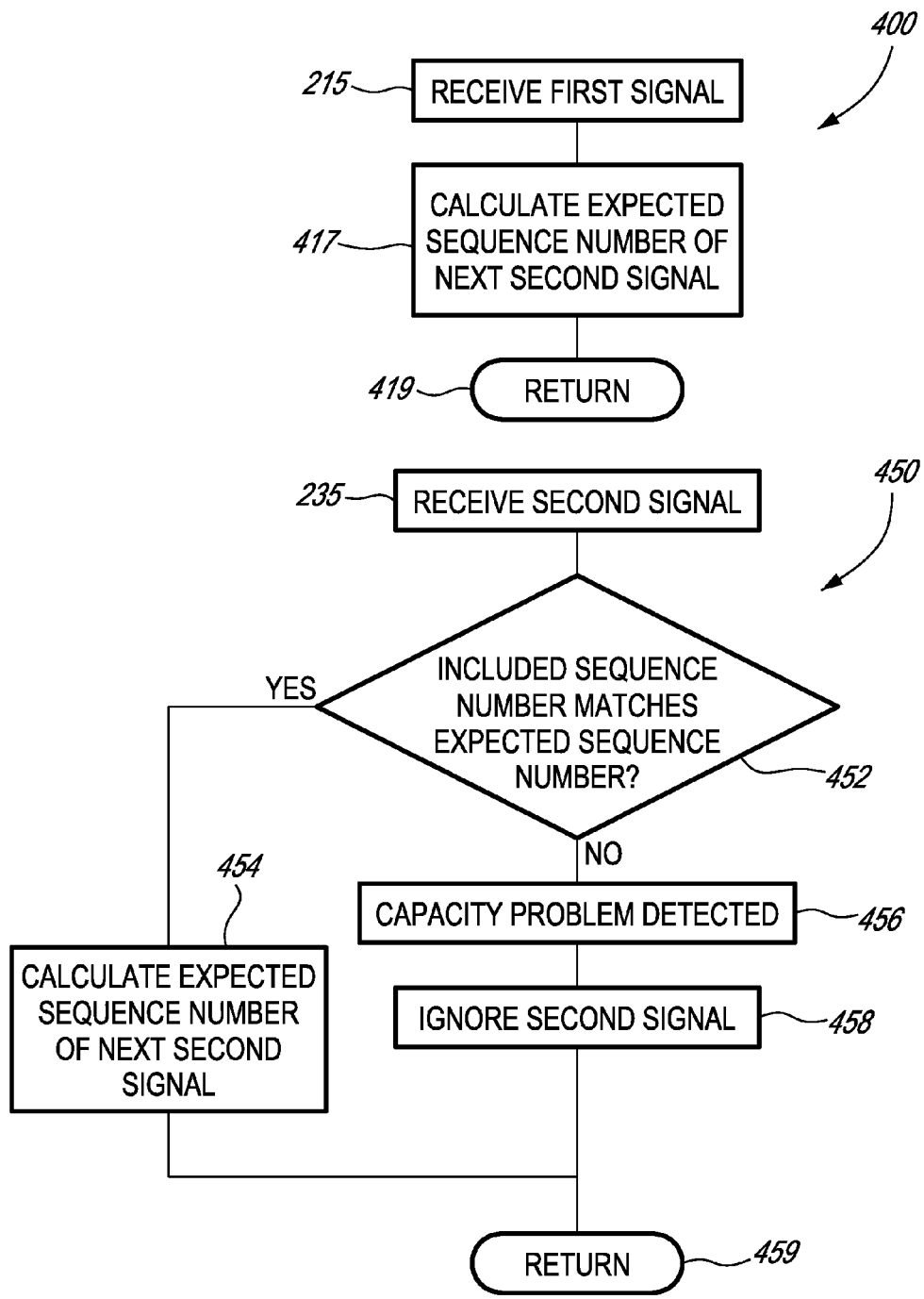
FIG. 4 illustrates some exemplary aspects for adding more precision in a process of determining a processing capacity of a node of interest.

FIG. 4 illustrates some exemplary aspects for adding more precision in the process of determining the processing capacity of the node of interest. Sequences 400 and 450 are operated in the peer node in parallel with some of the steps of the sequence 200 of FIG. 2, and may be viewed as optional subroutines of the sequence 200. In subroutine 400, the first signal is received by the peer node at step 215, as illustrated in the foregoing description of FIG. 2. The first signal may comprise an optional sequence number. If so, an expected sequence number of a next second signal is calculated at step 417, using function $F_2$. At step 419, the subroutine returns to the step following step 215 in FIG. 2, which is step 220. In subroutine 450, the second signal is received by the peer node at step 235, as shown in FIG. 2. The second signal may also comprise the sequence number. It is checked at step 452 whether or not the sequence number included in the second signal matches the expected sequence number. In some embodiments, a match is found in case of equality between the received sequence number and the expected sequence number. In other embodiments, a match may be found if the received signal number is greater than or equal to the expected signal number. In the presence of a match, another expected signal number, applicable to a next second signal, is calculated at step 454 and the subroutine returns at step 459 to the step following step 235 in FIG. 2, which is step 240. If it is seen at step 452 that the sequence number included in the second signal does not match the expected signal number, then the peer node detects that this second signal or another second signal has either been lost or delayed. The peer node detects at step 456 that a capacity problem has occurred. The capacity problem might be a processing capacity issue at the node of interest or a problem on a communication link between the peer node and the node of interest. At step 458, the peer node marks the second signal to be ignored in further processing of FIG. 2. The subroutine then returns at step 459 to the sequence of FIG. 2.

In some embodiments, similar logic could be used to calculate an expected sequence number of a next first signal. In a comparable manner, receiving the next first signal comprising a sequence number that does not match the expected sequence number for the next first signal would be indicative of a problem either at the node of interest or on the communication link between the peer node and the node of interest.

Figure 5:
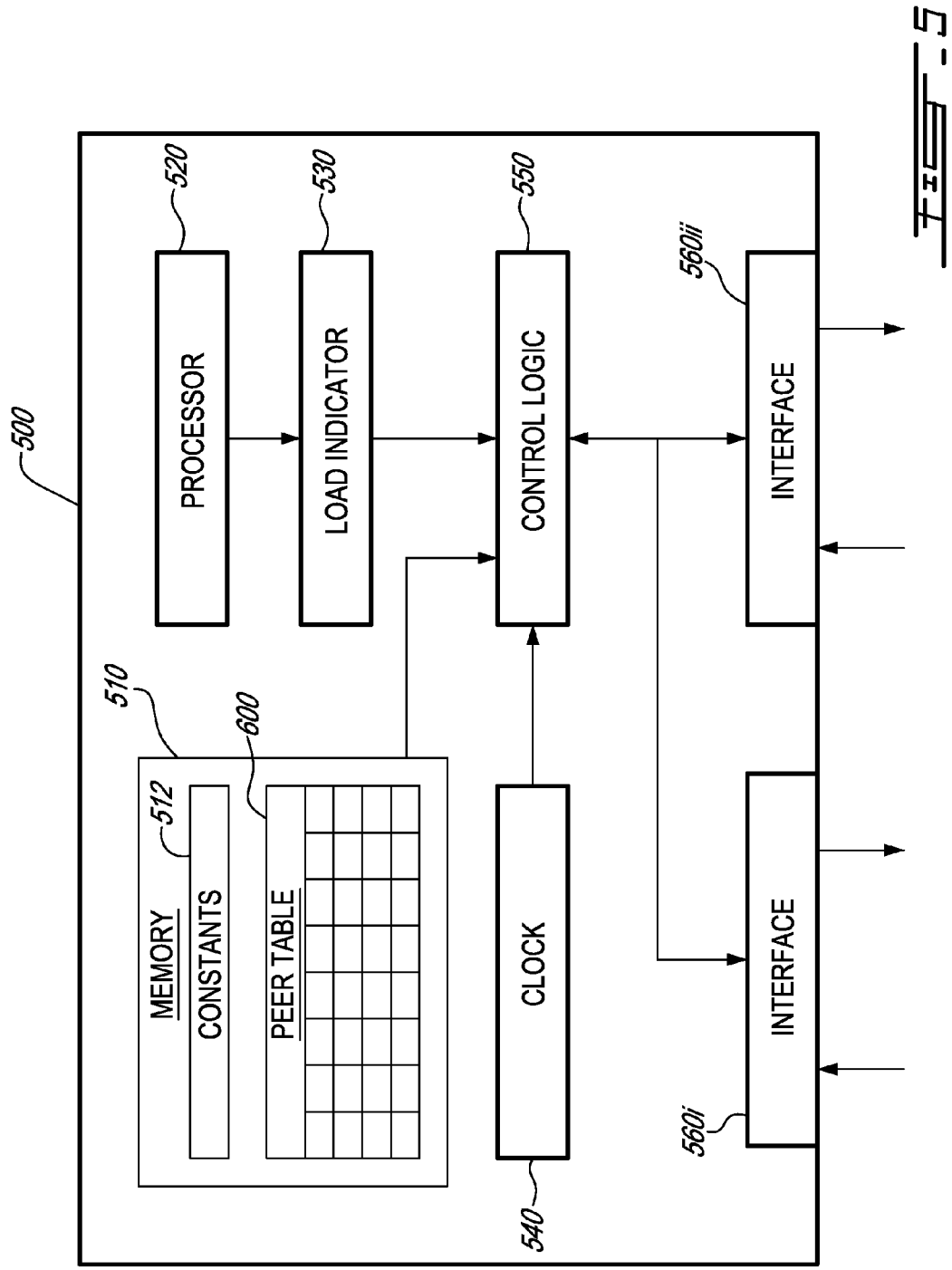
FIG. 5 shows an exemplary node according to an aspect of the present invention.

An exemplary construction of a node will now be described by reference to FIG. 5, which shows an exemplary node according to an aspect of the present invention. The exemplary node 500 comprises features enabling it to both propagate information about its own processing capacity and obtain information about a processing capacity of peer nodes. It should be understood that other exemplary nodes may comprise only some of those features, enabling these to either propagate or to obtain processing capacity information. Those other exemplary nodes may comprise a subset of the features of the exemplary node 500, according to the needs of a computing network architecture in which they are used.

The node 500 comprises a memory 510, a processor 520, a processor load indicator 530, a clock 540, a control logic 550, and one or more interfaces 560. Each of the interfaces 560 may be implemented as one single device or as distinct devices for receiving (input) and sending (output) signaling, messages and data. The node is connected towards a plurality of peer nodes; means for connecting the node towards peer nodes may vary as, for example, connection towards one peer node might be on an Ethernet link while connection towards another peer node might be on an asynchronous transfer mode (ATM) link. Therefore the node 500 may comprise a plurality of interfaces 560 for connecting on a plurality of links of different types. The node may further have other functions may thus comprise many more components, as is well-known in the art. In some embodiments, the node 500 is a complete system, for example a computer. In other embodiments, the node 500 essentially consists of a single processing element encompassing, for example, the processor 520, the load indicator 530, the clock 540 and the control logic 550.

The memory 510 may be, for some of its content, a temporary memory implemented for example using random access memory (RAM). For some other aspects, it is preferably a non-volatile memory, or persistent memory, that can be electrically erased and reprogrammed and that may be implemented, for example, as a flash memory or as a data storage module. The memory 510 stores some constants 512, comprising for instance the preset value representative of the maximum amount of processing available at the node 500, as used in the step 260 in the sequence 200 of FIG. 2, and the predetermined threshold used at step 330 in the sequence 300 of FIG. 3.

The memory 510 may also store a table 600 of peer nodes for storing information about the processing capacities of those peer nodes. FIG. 6 shows an exemplary peer table 600 according to some aspects of the present invention. The table 600 comprises several rows 620-628 which, except for a first row 620 which is a header row, relate to peers of the node having the table. The table is used by the node for obtaining and storing information about the processing capacity of nodes in the peer list. The peer table 600 comprises several columns 6022-616, some of which are optional. A first column 602 comprises identities of the peers $P_n$. A second column stores a time $T1_n$ of a latest instance of receiving the first signal, for example the HELLO signal. Whenever a new instance of the first signal is received, the time of receipt is compared with the previous time of receipt $T1_n$ to compute a first signal rate $R1_n$ which is stored in column 606. The new time of receipt overwrites the previous value in column 604. Of course, other equivalent embodiments could be used to keep track of the rate of receipt of the first signal. In some embodiments, the first signal rate in column 606 is simply overwritten with every receipt of the first signal. In other embodiments, the first signal rate $R1_n$ of column 606 may be averaged over time. In other embodiments, rather than storing one $T1_n$ value per row in column 604, an array of first signal time values could be stored in order to compute more accurate rates $R1_n$ for storage in columns 606. Columns 608 and 610, in a similar fashion, respectively store the time of receipt $T2_n$ and the rate $R2_n$ of the second signal, for example the ALIVE signal. A ratio of the two signal rates is stored in column 612, for each peer. In the exemplary peer table 600, the ratio is obtained by dividing the rate $R2_n$ of the second signal by the rate $R1_n$ of the first signal, and a ratio of 10 exemplifies a nominal rate. An optional column 614 stores a routing cost for a peer of a given column. The cost can be a numerical value, wherein a low cost indicates that routing towards the peer is favorable. It can also be a simple high or low indication. The cost may also be a binary indication indicating whether or not routing towards the peer is allowed. In some embodiments, the routing cost may be stored in a separate routing table, distinct from the peer table 600. Another optional column 616 stores an expected sequence number (E-SQN) $E_n$ for the next second signal. The peer table 600 may also comprise other columns (not shown) for maintaining additional information about the peers of the node.

In the peer table 600, exemplary peers $P_1$-$P_4$ on rows 622-628 illustrate various situations related to the processing capacities of those peers. On row 622, the processing capacity of $P_1$ is at its nominal level, as illustrated by the ratio equal to 10. Traffic may be routed towards $P_1$ and the routing cost is low. On row 624, the first signal has been received at least once from $P_2$, but the second signal has not yet been received. No second signal rate may be calculated for $P_2$ and, accordingly, the ratio is equal to zero. No traffic may be routed towards $P_2$ and the routing cost is high. On row 626, only the second signal has been received from $P_3$. Because a rate $R1_3$ of first second signal has not been set, a ratio of a rate $R2_3$ over a nil value for the rate of the first signal yields an infinite result. That is also indicative of a routing problem, so the routing cost is high. On row 628, the ratio for $P_4$ is equal to 7, which is less than the nominal value of 10. The processing capacity of $P_4$ is reduced somewhat and therefore a medium routing cost is assigned.

It should be noted that even though the content of the peer table has been represented in FIG. 6 in the form of a table, such content is not limited thereto. The peer table could be composed of a relational database, hard coded components, microprocessors, programming library, etc.

The processor 520 executes tasks according to features implemented in the node 520. The load indicator 530 continuously reflects a level of the load on the processor 520. The clock 540 periodically initiates a sequence in the control logic 550. At the beginning of each sequence, the control logic 550 reads the processor load from the load indicator 530. The control logic 550 reads the preset value from the constants 512 in the memory 510. The control logic 550 requests the one or more interfaces 560 to send a first signal, for example a HELLO message, once per sequence. The control logic 550 may optionally generate a sequence number for inclusion in the first signal, the sequence number of one instance of the first signal, sent during one sequence, being preferably generated based on a sequence number of the first signal in the preceding sequence. The control logic 550 then determines, from the processor load and from the preset value, a number N of second signals, for example ALIVE messages, to be sent during the sequence. If the processor load is low, the number N is set equal to the preset value. Determination of whether the processor load should be deemed high or low may depend on some constants 512 stored in the memory 510. The control logic 550 may calculate sequence numbers to be included in the ALIVE message, each successive sequence number being preferably calculated based on the sequence number of the previous sent signal. The control logic 550 requests the one or more interfaces 560 to send the second signals, in the determined number N, at a rate corresponding to N times the rate of the first signal.

One of the interfaces 560 may receive a succession of first and second signals from a peer node $P_n$ of interest, currently propagating information about its own processing capacity. The interface informs the control logic 550. The control logic 550 reads the time of receipt of the first or second signal by reading timing information from the clock 540 and stores in the peer table 600, on a row comprising an identity $P_n$ of the peer node, the time of the first signal $T1_n$, or the time of the second signal $T2_n$. As long as the first or second signals have been received a sufficient number of times, the processor calculates signal rates $R1_n$ and $R2_n$ and stores them for the peer node $P_n$. When both rates are calculated for the peer node $P_n$, the control logic 550 computes a ratio, indicative of a processing capacity of the peer node $P_n$, and stores it in the table, in column 612. The control logic 550 may optionally store a routing cost value for the peer node $P_n$. The first and second signals may comprise sequence numbers. The control logic 550 computes an expected sequence number (E-SQN) applicable to a next second signal received from the peer node $P_n$ and stores it as $E_n$. When the next second signal is received from the peer node $P_n$, if a sequence number included in that next second signal does not match the $E_n$, the control logic 550 may ignore the second signal.

Although several aspects of the preferred embodiment of the methods, and of the nodes of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of obtaining information about a processing capacity of a node, the method comprising the steps of:
   receiving from the node a first signal at a first rate;
   receiving from the node a second signal at a second rate;
   calculating a ratio between the second rate and the first rate; and
   determining the processing capacity of the node based on a comparison of the ratio with a preset value;
   wherein:
   each successive instance of the first signal comprises a sequence number calculated based on a sequence number of a previous instance of the first signal;
   an instance of the second signal received immediately after a latest instance of the first signal comprises a sequence number based on a sequence number of the latest instance of the first signal; and
   each successive instance of the second signal received before a next instance of the first signal comprises a sequence number based on a sequence number of a previous instance of the second signal.

2. The method of claim 1, wherein:
   the first rate is constant; and
   the second rate is variable.

3. The method of claim 1, wherein:
   the preset value is equal to a ratio between the second and first rates when the node has a normal processing capacity.

4. The method of claim 1, further comprising the steps of:
   updating a routing table based on the step of determining the processing capacity of the node; and refraining from sending messages towards the node when the processing capacity of the node is low.

5. The method of claim 1, further comprising the steps of:
monitoring changes in the ratio; and
detecting a change of processing capacity of the node when the ratio changes.

6. The method of claim 5, wherein:
a decrease of the second rate indicates a reduction of the processing capacity.

7. The method of claim 1, wherein:
the sequence number in each successive instance of the first signal is equal to the sequence number of the previous instance of the first signal plus the preset value;
the sequence number in the instance of the second signal received immediately after the latest instance of the first signal is equal to the sequence number of the latest instance of the first signal plus one; and
the sequence number in each successive instance of the second signal received before the next instance of the first signal is equal to the sequence number of the previous instance of the second signal plus one.

8. The method of claim 1, further comprising the steps of:
calculating an expected sequence number of a next instance of the second signal based on the sequence number of the latest instance of the first signal or based on the sequence number of the previous instance of the second signal; and
detecting a capacity problem by receiving the next instance of the second signal comprising a sequence number that is not equal to the expected sequence number.

9. The method of claim 1, further comprising the steps of:
calculating an expected sequence number of a next instance of the second signal based on the sequence number of the latest instance of the first signal or based on the sequence number of the previous instance of the second signal; and
wherein calculating the ratio between the second rate and the first rate comprises ignoring a given instance of the second signal comprising a sequence number that does not match the expected sequence number.

10. A method of propagating information about a processing capacity of a node, the method comprising the steps of:
determining an offered capacity value, the offered capacity value being equal to or less than a preset value indicative of a normal processing capacity of the node;
sending from the node a first signal periodically at a base rate; and
sending from the node a second signal periodically at a second rate indicative of the offered capacity value;
wherein the second rate is equal to the base rate multiplied by the offered capacity value.

11. The method of claim 10, wherein:
the node comprises a plurality of interfaces;
each periodic first signal is sent on all interfaces; and
each periodic second signal is sent on all interfaces.

12. The method of claim 10, wherein:
the offered capacity value is determined periodically.

13. The method of claim 10, wherein:
the offered capacity value is set according to an actual processing capacity of the node.

14. The method of claim 10, wherein:
the offered capacity value is set according to a preset percentage of the normal processing capacity of the node.

15. A node for propagating information about its processing capacity, comprising:
a processor;
a load indicator adapted to indicate a load level of the processor;
one or more interfaces adapted to send signals towards peer nodes; and
a control logic adapted to:
read the load level of the processor;
request the one or more interfaces to send a first signal at a first rate;
calculate a second rate based on a comparison of the load level and of a maximum amount of processing capacity of the node; and
request the one or more interfaces to send a second signal at the second rate;
wherein calculating a second rate based on a comparison of the load level and of the maximum amount of processing comprises setting the second rate to a maximum value when the load level is low.

16. The node of claim 15, further comprising:
a clock adapted to initiate a sequence of the control logic at the first rate.

17. The node of claim 15, wherein:
each successive instance of the first signal comprises a sequence number calculated based on a sequence number of a previous instance of the first signal;
an instance of the second signal sent immediately after a latest instance of the first signal comprises a sequence number based on a sequence number of the latest instance of the first signal; and
each successive instance of the second signal sent before a next instance of the first signal comprises a sequence number based on a sequence number of a previous instance of the second signal.

18. A node for obtaining information about a processing capacity of a peer node, comprising:
one or more interfaces adapted to receive signals from the peer node; and
a control logic adapted to:
receive from the one or more interfaces a first signal multiple times;
determine a first rate of the first signal;
receive from the one or more interfaces a second signal multiple times;
determine a second rate of the second signal;
calculate a ratio between the second and first rates; and
store in a peer table a processing capacity of the peer node based on the ratio;
and further comprising a clock; and
wherein the control logic uses timing information from the clock to determine the first and second rates, and stores the first and second rates in the peer table.

19. The node of claim 18, wherein:
the first and second signals comprise sequence numbers;
the control logic is further adapted to compute an expected sequence number of a next second signal based on a sequence number of a latest first signal or based on a sequence number of a previous second signal; and
the control logic is further adapted to store the expected sequence number in the peer table.

20. The node of claim 19, wherein:
the control logic is further adapted to detect a capacity problem by receiving a next second signal comprising a sequence number that is not equal to the expected sequence number.

21. The node of claim 19, wherein:
calculating a ratio between the second and first rates comprises ignoring a given second signal comprising a sequence number that does not match the expected sequence number.

* * * * *

UNITED STATES PATENT AND TRADEMARK OFFICE
CERTIFICATE OF CORRECTION

PATENT NO.        : 8,001,365 B2
APPLICATION NO.   : 11/955933
DATED             : August 16, 2011
INVENTOR(S)       : Rossi It is certified that error appears in the above-identified patent and that said Letters Patent is hereby corrected as shown below:

In Column 8, Line 52, delete "Where" and insert -- where --, therefor.

In Column 8, Line 59, delete "Where" and insert -- where --, therefor.

In Column 8, Line 66, delete "Where" and insert -- where --, therefor.

Signed and Sealed this
Twenty-ninth Day of January, 2013

David J. Kappos
*Director of the United States Patent and Trademark Office*